Jan. 5, 1965　　P. B. SHAFFER ETAL　　3,164,422
BEARING LUBRICATING AND SUPPORT ASSEMBLIES
FOR DYNAMOELECTRIC MACHINES
Filed Sept. 23, 1963　　　　2 Sheets-Sheet 1

Inventors:
Paul B. Shaffer,
Charles W. Otto,
by Henry J. Marcinick
Attorney.

Inventors:
Paul B. Shaffer,
Charles W. Otto,
by Henry J. Marciniak
Attorney.

United States Patent Office 3,164,422
Patented Jan. 5, 1965

3,164,422
BEARING LUBRICATING AND SUPPORT ASSEMBLIES FOR DYNAMOELECTRIC MACHINES
Paul B. Shaffer and Charles W. Otto, De Kalb, Ill., assignors to General Electric Company, a corporation of New York
Filed Sept. 23, 1963, Ser. No. 310,536
6 Claims. (Cl. 308—132)

This invention relates generally to dynamoelectric machines and more particularly to an improved bearing lubricating and support assembly of the self-aligning type for use in electric motors.

In order to achieve economy in size and reductions in the manufacturing costs of dynamoelectric machines, such as fractional horsepower motors, a pair of metallic end shield assemblies may be attached to the stator of the machine to provide a protective enclosure for the motor. Each end shield assembly includes a bearing lubricating and support assembly for rotatably supporting the shaft and for supplying a suitable lubricant to the bearing and shaft journal surfaces during motor operation. Also, the end shield assembly is provided with a suitable lubricant reservoir containing a mass of lubricant absorbent material from which lubricant is fed to the bearings during motor operation.

In a commonly used arrangement the lubricant is fed from the reservoir by capillary action through a wick that is comprised of felt and communicates with the shaft journal. Lubricant escaping at the ends of the bearing is collected and returned to the lubricant reservoir. Grooves are provided in the shaft journals to facilitate circulation of the lubricant. For a given bearing surface area, these grooves reduce the effective load bearing capacity of the bearings. Although such a conventional arrangement has been satisfactory in many applications, difficulties have been encountered in applications where the motor is subjected to heavy side loads during operation. Frequently, in such applications excessive friction between the bearing and the shaft journal has resulted in premature failure of the bearings.

Accordingly, it is a general object of the present invention to provide an improved bearing support and lubricating assembly for dynamoelectric machines.

It is a more specific object of the present invention to provide an improved bearing support and lubricating assembly in which a continuous supply of lubricant to the shaft journal is effectively maintained for all load angles.

Another object of the present invention is to provide an improved self-aligning and self-lubricating arrangement for a bearing lubricating and support assembly that is particularly adaptable for use in small fractional horsepower motors.

It is a more specific object of the present invention to provide an improved bearing lubricating and support assembly that does not appreciably add to the size, axial length and weight of the motor.

In carrying out the objects of this invention in one form thereof, I have provided an improved bearing lubricating and support assembly for use with a motor end shield member formed with a central hub portion and a bearing socket extending outwardly therefrom. A self-aligning bearing member is engaged in the bearing socket and is formed with a first and second pair of axially aligned and spaced slots at the ends of the bearing member for receiving a pair of wick elements.

A passage for the flow of lubricant to the shaft journal is provided by the pair of wick elements, each of which is formed with a pair of radial fingers for contacting the shaft journal and an axial finger extending through an aperture in the hub portion to provide for the passage of lubricant therethrough. The radial fingers contact the shaft journal to supply lubricant thereto, and the lubricant forms a fluid film between the journal and bearing. At any given instant of operation at least one of the radial fingers engages the shaft journal in a low pressure region of the oil film.

In order to enclose the assembly, lubricant chambers are provided by cover members or caps mounted at the outer and inner sides of the hub portion. A ring or mass of lubricant absorbent material is disposed in at least one of the lubricant chambers for the storage of lubricant. A retaining means secured to the hub portion restrains axial movement of the self-aligning bearing member but allows for swiveling movement relative to the socket portion. Preferably, a thrust bearing means is carried on a radial face of the bearing member so that a thrust bearing surface is provided that is always normal to the axis of the shaft as the bearing member aligns itself with respect to the shaft.

With the improved lubricating and bearing support arrangement, it is possible to eliminate the need for lubricating grooves in the shaft and increases the effective bearing area thereby to permit higher bearing loads. Also, the improved arrangement is capable of providing satisfactory performance when the radial load to the shaft is applied in any angular direction.

The subject matter which I regard as my invention is particularly pointed out and distinctly claimed in the concluding portion of this specification. My invention, itself, however, both as to its organization and method of operation, together with further objects and advantages thereof, may best be understood by reference to the following description taken in conjunction with the accompanying drawings in which:

FIGURE 4 is an exploded view of the improved bearing lubricating and support assembly of the switch end (right side) of the motor illustrated in FIGURE 1; and FIGURE 5 is an exploded view of the bearing lubricating and support assembly used at the left end of the motor shown in FIGURE 1.

Having more specific reference now to the drawings, I have shown the invention embodied in a single phase induction motor 10 of the fractional horsepower type. The motor 10 has a stator core 11 of standard construction with a stator winding 12 placed in slots formed in the stator core 11. The stator core 11 is encased by a frame formed by end shield members 13, 14, which may be suitably secured to the stator core 11 by welding or by other suitable bonding means.

Figure 3:
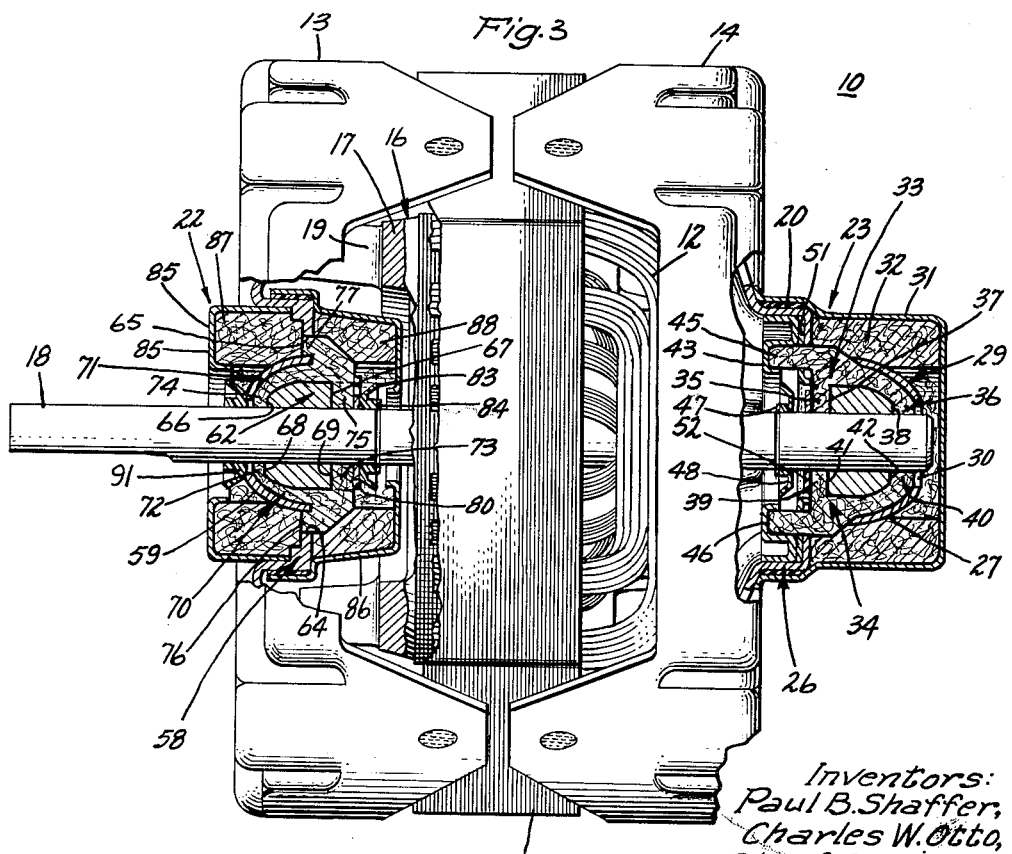
FIGURE 3 is an enlarged side view, partially broken away and partly in cross section along lines 2—2 of the view shown in FIGURE 2 of the motor shown in FIGURE 1.

As will be seen in FIGURE 3, a rotor 16 is rotatably supported for relative rotation with respect to the stator core 11 and includes a laminated magnetic core of magnetic material in which a squirrel cage winding 17 is disposed. The rotor 16 is secured to a shaft 18 by any suitable means, such as a pressed fit, and extends outwardly of the end shield member 13 to provide a driving connection for a driven member (not shown). Cast integrally with the end ring of the squirrel cage winding 17 are fan blades 19 for circulating ventilating air through the motor 10.

Figure 1:
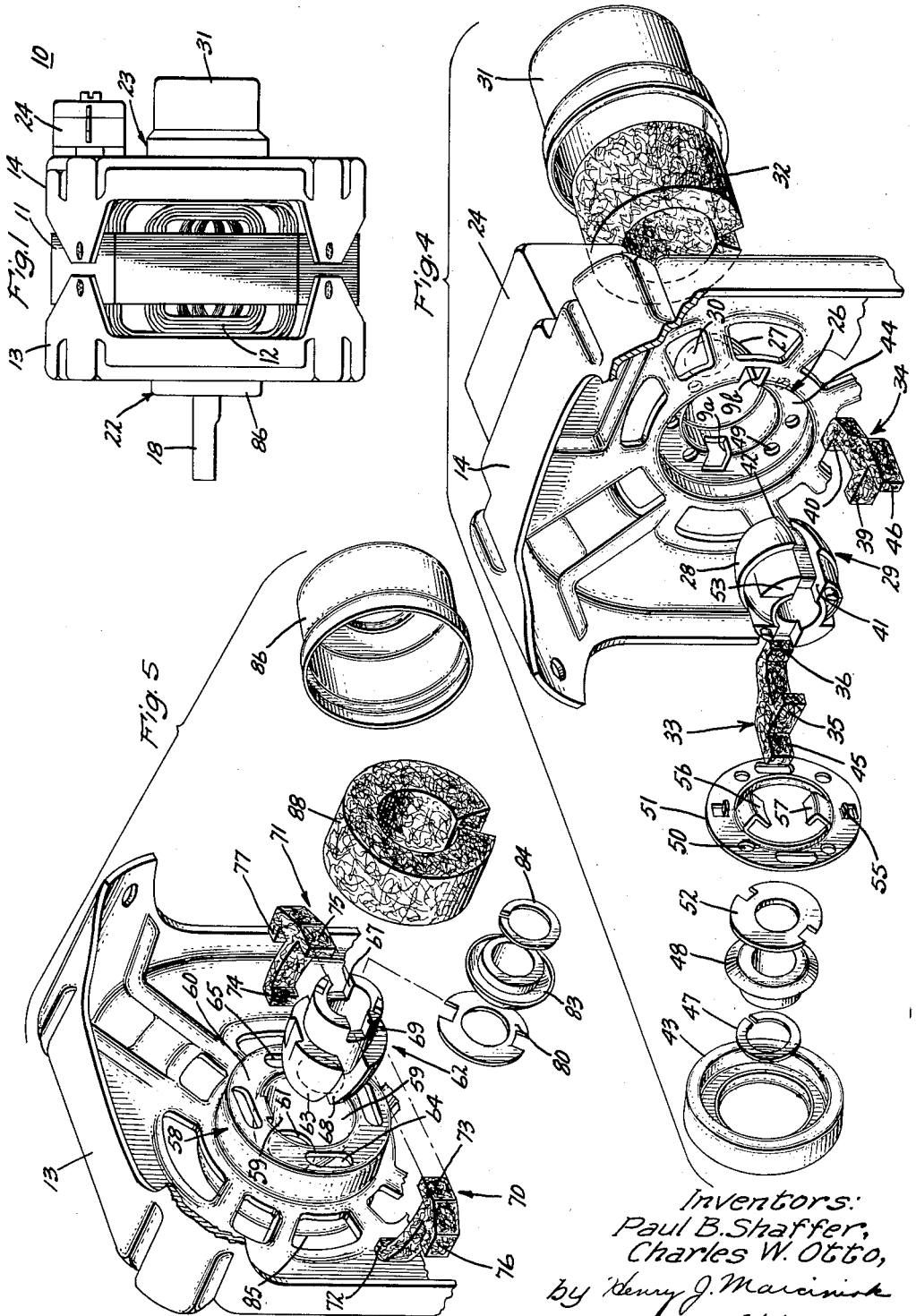
FIGURE 1 is a side view of a motor embodying one form of the improved bearing lubricating and support assembly.
Figure 2:
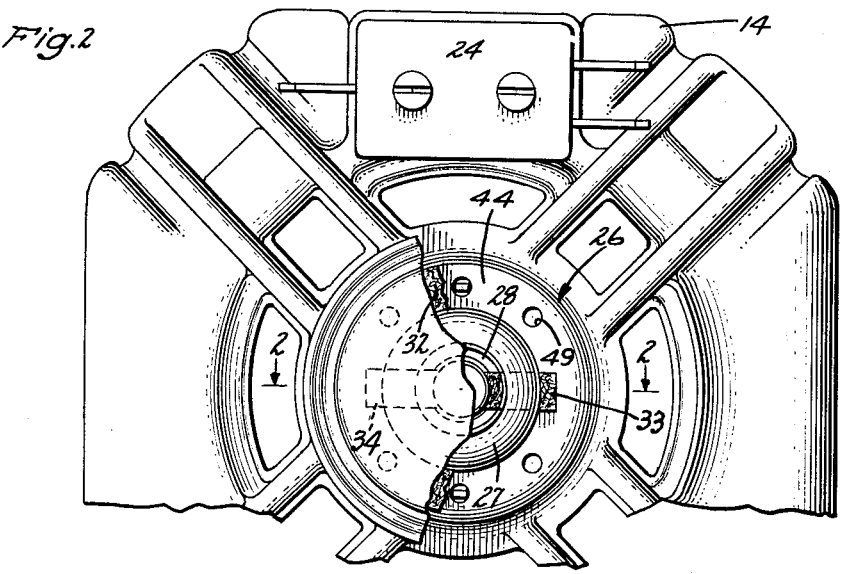
FIGURE 2 is an enlarged partial end view of the switch end of the motor shown in FIGURE 1, with the end cap and lubricant absorbent material cut away to more clearly show the hub portion of the motor end shield.

Both bearing lubricating and support assemblies 22, 23 at the left and right end of the motor 10 incorporate the improved arrangement of the invention. The assembly 23 employed at the right end is particularly adaptable for use in a motor employing a centrifugally actuated switch 24, shown in FIGURE 1. Although the improved bearing lubricating and support assemblies 22, 23 differ in structural arrangement, it will be understood that the assemblies 22, 23 are essentially similar in the principle and mode of operation, as will hereinafter be more fully set forth.

Having more specific reference now to the bearing lubricating and support assembly 23 shown in the right end of the FIGURE 3 and in the exploded view of FIGURE 4, it will be seen that the end shield member 14 is formed with a central hub portion 26 having socket 27 adapted to provide a seat for the seating portion 28 of a self-aligning bearing member 29. The central hub portion 26 is formed with a central opening 30 through which the shaft 18 can extend. A cover member or cap 31 is attached to the end shield member 13 at the outer side thereof to provide a lubricant chamber. Preferably, the cover member 31 was sealingly bonded to the hub portion 26 by a suitable thermosetting resin adhesive 20, such as an epoxy resin. If desired, the cover member 31 may in some applications provide support for a resilient mounting ring where it is necessary to resiliently support the motor 10.

A ring or mass 32 of lubricant absorbent packing material, which may be of any suitable type that will retain ample quantities of lubricant, is disposed in the lubricant chamber formed by cover member 31. In order to feed lubricant stored in the ring 32 of packing material to the bearing member 29, a pair of wick elements 33, 34 serve as a capillary means for feeding lubricant to the journal member 18. The wick element 33 is formed with a pair of spaced apart radial fingers 35, 36 which are disposed in the first pair of axially spaced slots 37, 38 located at the ends of the bearing member 29 and engage the shaft journal. Similarly, the other wick element 34 is also formed with a pair of radial fingers 39, 40 which are disposed in a second pair of axially spaced slots 41, 42 and engage the shaft journal.

To provide for the passage of lubricant through the annular face 44 of the hub portion 26, the wick elements 33, 34 are provided with portions 45, 46 which extend through the apertures 9a, 9b of the hub portion 26. Lubricant leaking from the bearing member 29 at the right end, as seen in FIGURE 3, will be collected by the ring 32 of lubricant absorbent material. Lubricant that seeps out of the bearing member 29 at the left end is thrown by an oil flinger 48 into an oil well or cover member 43 and is picked up by the axial fingers 45, 46. Also, lubricant is returned to the ring 32, which serves as a lubricant reservoir, by gravity flow through oil return holes 49, 50 formed respectively in the annular face 44 of the central hub portion 26 and in the annular retainer 51. A thrust plate 52 which is anchored to the inner radial surface 53 of the bearing member 29 and cooperates with an annular surface formed on the oil flinger 48 to absorb the thrust of the shaft 18. A retaining spring 47 fixes the axial position of the oil flinger 48 on the shaft 18.

Axial movement of the bearing member 29 is restrained by the annular retainer 51 which is held against the hub portion 26 by the oil well cover member 43 which provides a second lubricant chamber or oil well at the inner side of the end shield member 14. It will be noted that the retainer 51 is formed with a pair of positioning arms 56, 57 which allow a limited amount of rotational and swiveling movement of the bearing member within the socket 27 but prevent axial movement relative to the socket 27. Tabs 55 of retainer 51 engage holes 49 of hub, preventing rotation between those parts.

Referring more specifically to the improved bearing lubricating and support assembly 22 at the left end of the motor 10, the components of this assembly as shown in FIGURES 3 and 5 will now be more fully described. It will be noted that the end shield member 13 is formed with a central hub portion 58 having a socket 59 and annular face 60 with a central aperture 61. A self-aligning bearing member 62 is formed with a seating portion 63 engaged in the socket 59. The bearing member 62 is made of a suitable bearing material, such as an aluminum alloy, and has a central bore dimensioned to receive the shaft 18. Two pairs of slots 66, 67 and 68, 69 are formed in the bearing member 62 at the ends thereof.

As in the other assembly 23 at the right end of the motor 10, wick elements 70, 71 of assembly 22 are cut with radial fingers 72, 73 and 74, 75 which are disposed in the slots 68, 69 and 66, 67, respectively, to contact the shaft journal. It will be noted also that the wick elements 70, 71 are provided with axial fingers 76, 77 which extend through the openings 64, 65 in the hub portion 58.

An annular-shaped thrust plate 80 is peened on the inner radial surface of the self-aligning bearing member 62 and swivels with the bearing member 62 to insure that the thrust surface provided by the plate 80 is always normal to the axis of rotation. The oil flinger 83 carried on the shaft 18 is provided with an annular surface that engages the thrust plate 80. Axial movement of the oil flinger 83 is restrained by the retaining spring 84. A retainer may be employed in the assembly 22 to restrict the axial movement of the bearing member 62.

A first cover member 85 is attached to the end shield member 13 at the outer side of the central hub portion 58 and forms therewith a lubricant chamber. A cover member 86 is attached to the annular surface of the central hub portion 58 to provide a second lubricant chamber and is preferably bonded thereto by a suitable resin adhesive means. It will be noted that the rings 87, 88 of lubricant absorbent material are disposed in both the outer and inner lubricant chambers formed by cover members 85 and 86. Portions of the wick elements 70, 71 are in contact with both rings 87 and 88 of lubricant absorbent material.

During operation lubricant squeezed out at the right end of the bearing member 62 is thrown by oil flinger 83 into ring 88 of lubricant absorbent material and becomes available for resupply to the bearing member 62. Lubricant squeezed out at the outer end of the bearing is deflected by an oil flinger 91 and thrown against ring 87. From the rings 87, 88 the oil is carried by capillary type of action in the wick elements 70, 71 to the shaft journal and bearing member 62. In view of the continuous recirculation of the lubricant, periodic addition of oil to the rings 87, 88 is not required.

In accordance with the improved bearing lubricating and support arrangement a lubricant film is provided between the shaft journal and the bearings. As used herein, a lubricant film means that under running conditions the shaft is supported by a fluid film of lubricant, and no metallic contact occurs between the bearing members 29 and 62 and the shaft journals.

When the motor 10 is used to drive a load, for example, by means of a belt, the belt load will create a pressure on the bearing in the direction of the load. Essentially, one half of the lubricant film between the shaft journal and the bearing is under pressure or has a high pressure region, while essentially the other portion of the lubricant film is under a relatively low pressure or has a low pressure region. We have found that by utilizing a lubricating arrangement wherein two pairs of radial fingers, such as the radial fingers 35, 36 and 39, 40 of the wick elements 33, 34, contact the shaft journal adjacent the ends of the bearing member 29, one pair of the radial fingers may contact the shaft journal 25 in the high pressure region and the other pair of radial fingers will contact the shaft journal 25 in the low pressure region of the lubricant film. Further, the pair of radial fingers in high pressure region will remove oil where it is not needed, and the other pair of radial fingers will supply oil to the shaft journal in the low pressure region where oil is required.

An important advantage of such an arrangement is that satisfactory bearing performance results irrespective of the angular direction in which the radial load is applied to the driving shaft. Another advantage of the present lubricating arrangement is that the need for shaft grooves is eliminated and more bearing area is thereby made available. Also, the elimination of grooves in the shaft permits higher bearing loads since the lubricant does not bleed out of the bearing in the high pressure region to the extent that it would bleed out if grooves were employed on the shaft journal.

While the invention has been explained by describing various embodiments thereof, it will be apparent that many modifications may be made without departing from the spirit of the invention, and it is therefore intended to cover all such equivalent variations which are within the scope of the appended claims.

What we claim as new and desire to secure by Letters Patent of the United States is:

1. A bearing support and lubricating assembly for use in an electric motor comprising: an end shield member formed with a central hub portion having apertures formed therein, said central hub portion having a bearing socket therein; means including a cover member defining a lubricant chamber adjacent said hub portion; a mass of lubricant absorbent material disposed within said first lubricant chamber; a bearing member formed with a seating portion engaged in the bearing socket and with a central bore for receiving the shaft journal, said bearing member having a first and second pair of axially spaced slots at the ends of the bearing member; a pair of wick elements, each formed with a pair of radial fingers and a contact portion, one pair of radial fingers being disposed in the first pair of slots for contact with the shaft journal and the other pair of radial fingers being disposed in the second pair of slots for contact with the shaft journal, and the contact portion of said wick elements contacting said lubricant absorbent material to provide for the passage of lubricant thereto.

2. A bearing support and lubricating assembly for use in an electric motor comprising: an end shield member formed with a central hub portion having an annular face with apertures formed therein, said central hub portion having a bearing socket extending outwardly therefrom; a first cover member mounted at the outer side of said end shield member adjacent to said annular face to provide a first lubricant chamber; a second cover member mounted at the inner side of said central hub portion to provide a second lubricant chamber; a ring of lubricant absorbent material disposed within said first lubricant chamber; a bearing member formed with a seating portion engaged in the bearing socket and with a central bore for receiving the shaft journal, said bearing member having a first and a second pair of axially spaced slots communicating with the central bore adjacent to the ends thereof, said pairs of slots being at diametrically opposite locations in the bearing member; means for retaining said bearing member in said bearing socket for relative movement therein; and a pair of wick elements, each formed with a pair of axially spaced radial fingers and an axial finger, said radial fingers of one of said wick elements being disposed in said first pair of slots and said radial fingers of the other wick element being disposed in the second pair of slots, said axial fingers extending through the apertures in the annular face to provide a passage for the flow of oil therethrough.

3. A bearing support and lubricating assembly for use in an electric motor comprising: an end shield member formed with a central hub portion having apertures formed therein, said central hub portion having a bearing socket extending outwardly therefrom; means including a cover member defining a lubricant chamber adjacent said hub portion; a mass of lubricant absorbent material disposed within said lubricant chamber; a bearing member comprised of a seating portion engaged in said bearing socket, said bearing member formed with a central bore receiving a shaft journal and with a first and second pair of axially spaced slots and a pair of wick elements, each formed with a pair of axially spaced radial fingers and with a contact portion, the radial fingers of one of said wick elements being disposed in said first pair of slots and the radial fingers of the other of said wick elements being disposed in the second pair of slots, said radial fingers contacting the shaft journal to provide lubricant thereto, said lubricant forming a film between the journal and bearing, said film when under load having a high pressure and a low pressure region, and at least one of said radial fingers being in a low pressure region at any given instant during operation, and said contact portions of said wick elements contacting said lubricant absorbent material through apertures in said hub portion to provide a passage for the flow of lubricant therethrough.

4. A bearing support and lubricating assembly for use in an electric motor comprising: an end shield member formed with a central hub portion having an annular radially extending face with apertures formed therein, said central hub portion being formed with a bearing socket extending outwardly therefrom; a first cover member attached to said end shield member at the outer side of said hub portion to provide a first lubricant chamber; a second cover member attached to said end shield member at the inner side of said central hub portion to provide a second lubricant chamber; a ring of lubricant absorbent material disposed within said first lubricant chamber adjacent to said annular face; a self-aligning bearing member formed with a seating portion engaged in said bearing socket and with a central bore for receiving a shaft journal, said bearing member having a first and a second pair of axially spaced slots at the ends of the bearing member, and said slots communicating with the central bore; means for retaining said bearing member in said bearing socket for relative movement therein; a pair of wick elements, each formed with a pair of axially spaced radial fingers and an axial finger, one pair of said radial fingers being disposed in the first pair of slots for contact with the shaft journal and the other pair of said fingers being disposed in the second pair of slots for contact with the shaft journal, said axial fingers of said wick elements extending through apertures in said annular face and communicating with the lubricant chambers to provide a passage for the flow of lubricant thereto.

5. In an electric motor having an end shield member formed with a central hub portion, said central hub portion having apertures formed therein and a bearing socket extending outwardly therefrom; means including a cover member defining a lubricant chamber adjacent said hub portion; a self-aligning bearing member formed with a seating portion engaged in said bearing socket, said bearing member formed with a central bore for receiving the shaft journal and with a first and second pair of axially aligned and spaced slots at the ends of the bearing member communicating with the central bore; said bearing member including a thrust plate attached to the end of said bearing member to provide a thrust bearing surface that is essentially normal to the axis of the shaft as the bearing member aligns itself; means for retaining said bearing member in said bearing socket for relative movement therein; a ring of lubricant absorbent material disposed within said lubricant chamber; and a pair of wick elements, each formed with a pair of axially spaced radial fingers and with an axial finger, said radial fingers of one of said wick elements being disposed in said first pair of slots and the radial fingers of the other of said wick elements being disposed in the second pair of slots, said axial fingers of said wick elements extending through apertures in said hub portion to provide for the passage of oil therethrough, and said wick elements being disposed in engagement with said ring of lubricant absorbent material.

6. In an electric motor having an end shield member formed with a central hub portion having an annular face with apertures formed therein, said central hub portion having a bearing socket extending outwardly therefrom; a first cover member attached to the end shield member at the outer side of the central hub portion and defining with said central hub portion a first annular lubricant chamber; a second cover member attached to the end shield member at the inner side of said central hub portion to provide a second annular lubricant chamber; a self-aligning bearing member formed with a seating portion engaged in said bearing socket and formed with a central bore for receiving the shaft journal, said self-aligning bearing member having a first and second pair of axially spaced slots communicating with the central bore adjacent the ends of said bearing member; annular means for retaining said bearing member in said bearing socket for relative movement therein and being formed with a pair of apertures aligned with apertures formed in said annular face of the central hub portion; a ring of lubricant absorbent material disposed within said first and second annular lubricant chambers; a pair of wick elements, each formed with a pair of axially spaced radial fingers and an axial finger, said radial fingers of one of said wick elements being disposed in the first pair of said slots for contact with the shaft journal and the radial fingers of the other of said wick elements being disposed in the second pair of openings for contact with the shaft journal, and said axial fingers of the wick elements extending through the apertures in said hub portion and said annular means to provide a passage for the flow of lubricant between said annular lubricant chambers.

References Cited in the file of this patent
UNITED STATES PATENTS

| | | |
|---|---|---|
| 2,306,743 | Morrill | Dec. 29, 1946 |
| 2,752,208 | Wightman | June 25, 1956 |